April 28, 1942.                A. DE L. SINDEN                2,281,026
                                  CONVEYER
                           Filed March 2, 1940            2 Sheets-Sheet 1
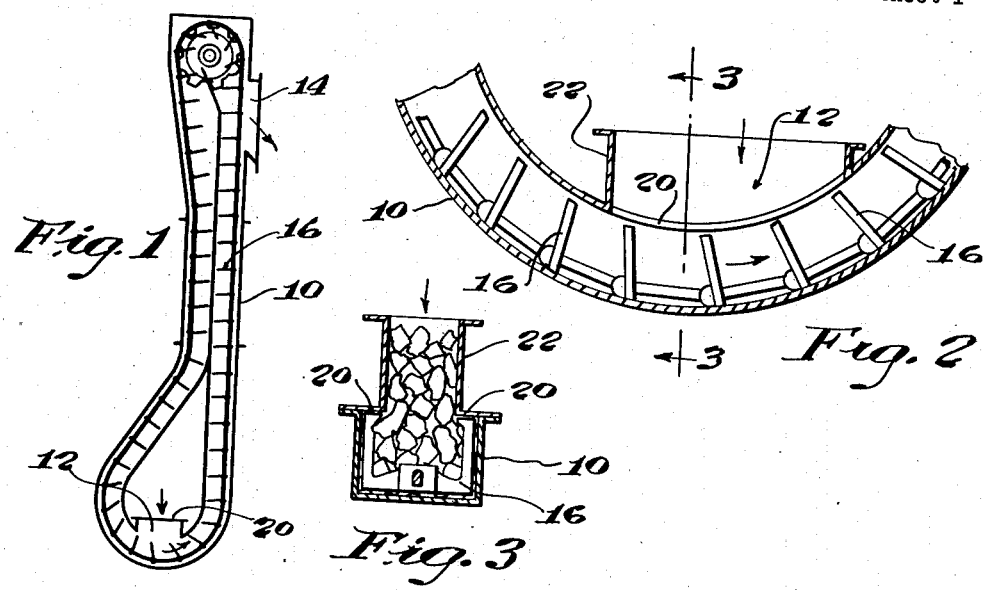
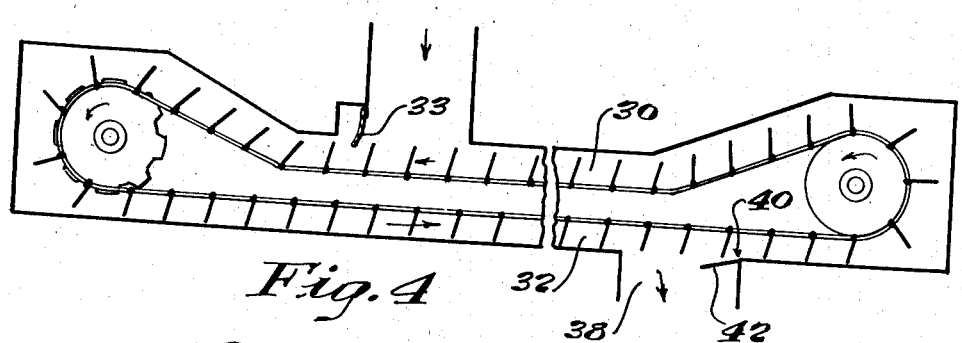
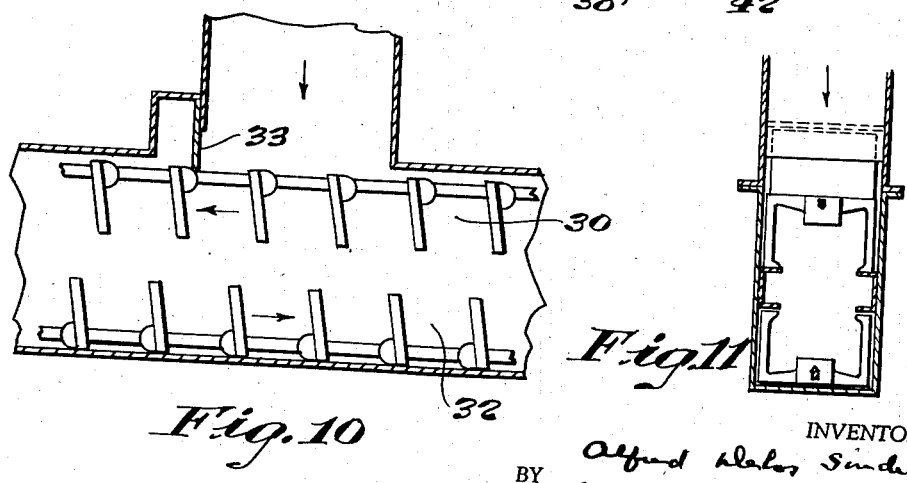
INVENTOR.
Alfred de Los Sinden
BY J. Stanley Churchill
                    Atty.

April 28, 1942.    A. DE L. SINDEN    2,281,026

CONVEYER

Filed March 2, 1940    2 Sheets-Sheet 2

INVENTOR.
Alfred DeLos Sinden
BY J. Stanley Churchill atty

Patented Apr. 28, 1942

2,281,026

UNITED STATES PATENT OFFICE 2,281,026

CONVEYER

Alfred De Los Sinden, Aurora, Ill., assignor to Redler Conveyor Company, Quincy, Mass., a corporation of Massachusetts Application March 2, 1940, Serial No. 321,968

3 Claims. (Cl. 198—168)

This invention relates to a conveyer for conveying flowable solid material.

The object of the invention is to provide a novel and improved construction of conveyer which finds particular use in conveying lumpy materials and with which the liability of jamming the conveyer and injuring the component parts thereof is reduced to a minimum.

With this general object in view, and such others as may hereinafter appear, the invention consists in the conveyer and in the various structures, arrangements and combinations of parts hereinafter described and particularly defined in the claims at the end of this specification.

Figure 7:
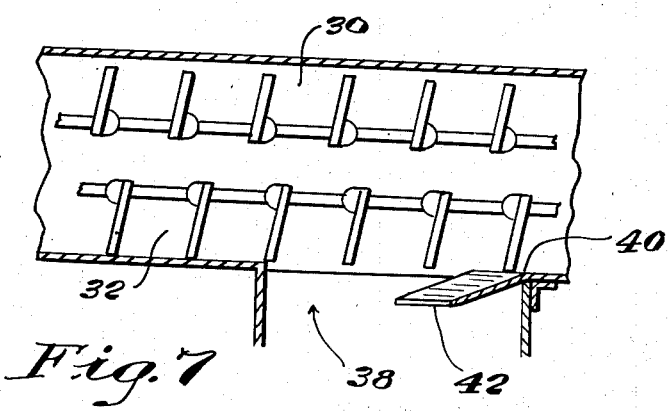
Figure 8:
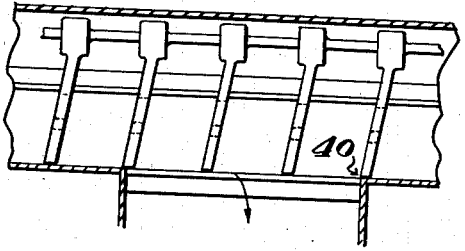
Figure 9:
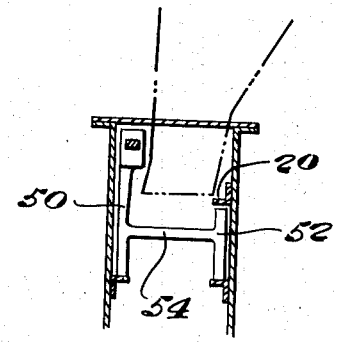
Figure 5:
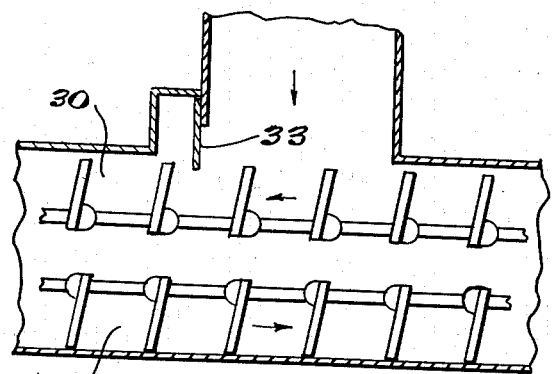
Figure 6:
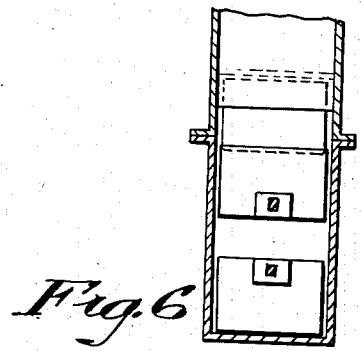

In the drawings illustrating the preferred and also modified forms of the invention, Fig. 1 is a more or less diagrammatic view in side elevation illustrating one form of the present conveyer; Fig. 2 is an enlarged detail in side elevation of the inlet section of the conveyer; Fig. 3 is a cross-section on the line 3—3 of Fig. 2; Fig. 4 is a more or less diagrammatic view in side elevation illustrating a modified form of the present conveyer; Figs. 5 and 6 are details in longitudinal and cross-section respectively of the inlet structure of the conveyer shown in Fig. 4; Fig. 7 is an enlarged detail in longitudinal section illustrating a modified structure of the discharge section of the conveyer; Figs. 8 and 9 are views in longitudinal and cross-section respectively of still another modified form of the invention at the discharge section thereof; and Figs. 10 and 11 are views similar to Figs. 5 and 6, illustrative of an open flight type of conveyer.

Prior to the present invention substantial difficulty has been encountered in handling certain types of lumpy flowable material in conveyers of the type embodying an elongated casing and a conveying element having spaced flights adapted to be drawn therethrough. Among such material may be mentioned crushed stone, coal, and other material containing lumps of a hardness such that, when wedged between the flights of the conveyer and the sharp edge of the conveyer casing forming the rear edge of the inlet or discharge opening therein, the flights oftentimes become broken or bent, or the conveyer stalled and rendered inoperative. The present invention contemplates novel and improved structures of the conveyer at the inlet and discharge sections thereof and different features of the invention find particular use in conveyers of the open flight type such as form the subject matter of the Redler United States Reissue Patent No. 18,445, while other features of the invention are particularly useful in connection with conveyers of the solid flight type type, such for example as illustrated in the United States patent to White No. 2,066,866.

Referring to the drawings, I have illustrated in Figs. 1, 2 and 3 a construction of conveyer of the open flight type which is provided with an elongated casing 10 arranged to extend vertically in the form of a loop provided with an inlet opening 12 in the lower portion thereof and an outlet 14 in the upper portion thereof, such type of conveyer being useful in elevating flowable solid material. The casing 10 has disposed within the same an endless conveying element made up of a plurality of flexibly connected flights 16. The flights 16 are in accordance with the present invention provided with upright legs and preferably are of U or similar shape designed to provide an open space at the upper end of each flight between the legs through which lumpy material may be introduced into the casing and to within the flight. Provision is made for covering the exposed ends of the upright legs of the flights so that lumpy material may not become jammed between the upper ends of the flights and the portion of the casing forming the edges of the inlet opening therein. For this purpose, portions 20 of the casing may form in effect cover members extended over and in close proximity to the ends of the flights. The cover members 20 may, as shown in Fig. 3, comprise portions of the top wall of the casing upon each side of the inlet opening therein, or if desired, brackets or separate pieces may be welded or otherwise secured to the casing to form these covers 20. The upper wall of the casing is provided with an inlet herein shown as comprising the conduit 22, and the width and disposition of the inlet conduit 22 with respect to the covers 20 and flights underlying the same are such as to introduce the lumpy material into the open space between the legs of the flights. In the type of conveyer shown in Fig. 1, the inlet conduit 22 and the inlet opening in the top wall of the casing are provided at the inside of the loop as shown in Figs. 1 and 2.

While the inlet structure illustrated in Figs. 2 and 3 solves the problem of preventing injury to the flights by reason of jamming of the flights by a lump of hard material such as crushed stone, coal, or the like, between the flights and the marginal portions of the opening in the conveyer casing through which the material is introduced therein, nevertheless, such structure is unsuitable for accomplishing this result in those types of conveyers embodying solid flights. In Figs. 4, 5 and 6, I have illustrated a conveyer of the solid flight type, such for example as is illustrated in the White patent above referred to. As illustrated in detail in Figs. 5 and 6, this type of conveyer may and preferably will be provided with two runs 30, 32 of the conveyer element arranged to pass one above the other. The space between the flights immediately below the inlet opening 34 in the conveyer casing 10 is intentionally free from obstructions so as to permit the lumpy material to fall through the upper run 30 between adjacent flight members and to pass into the lower portion of the casing to be conveyed by the lower run 32 of the conveying element to the discharge opening in the casing. A yieldable flap 33 is preferably provided at the rear edge of the inlet opening in the top wall of the casing to assist in preventing jamming at this point. At the discharge opening 38 provision is made for preventing the lumpy material being conveyed by the solid flights of the lower run of the conveying element from being suddenly forced against the sharp edge 40 of the discharge opening 38 in the conveyer casing. Under ordinary operating conditions, the material is discharged without trouble, but in those instances where the outlet becomes choked, as in stoker feeds, liability exists of a hard lump becoming jammed between a flight and the rear edge 40 of the discharge opening. To prevent this jamming, I preferably provide a guide member 42 which is inclined downwardly from the discharge edge 40 in the manner illustrated and serves to cause any material being discharged thereon to ride up gradually as the conveyer flights continue to move past the edge 40 to be again returned onto the upper run of the conveyer and again delivered through the inlet down onto the lower run. In some instances, this discharge structure finds use in conveyers embodying open flights as will be apparent from inspection of Figs. 10 and 11.

In Figs. 8 and 9, I have illustrated a further modification of the present invention which is designed to prevent troubles at the discharge end of the conveyer by reason of lumpy material becoming jammed between the edges of the conveyer flights and the edge of the discharge opening in the conveyer casing. As herein shown, an open flight of the type embodying two upright side legs 50, 52 and a cross-bar 54 connecting the side legs at a substantial distance above the bottom of the legs, so that when lumpy material is being drawn by a conveying element embodying flights of the illustrated type approaches the discharge opening in the bottom wall of the casing, the cross-bar 54 is spaced sufficiently above the sharp edge 40 of the discharge opening so that no liability exists for a lump of the material being jammed between the cross-bar and the edge 40 of the discharge opening. In the illustrated conveyer structure a cover 20, similar to the cover shown in Fig. 3, is preferably provided immediately above the upper end of the shorter upright legs of the conveyer flights to protect the same against lumps at the inlet end of the conveyer. The inlet is preferably arranged of less width than the space between the legs of the flight, as illustrated in dotted lines in Fig. 9.

Having thus described the invention, what is claimed is:

1. In a conveyer for conveying lumpy material, in combination, a casing having an inlet opening in the top wall thereof, a conveyer element adapted to be drawn through the casing provided with a plurality of spaced flights, said flights being of a skeleton structure adapted to convey the material in a continuous stream through the casing and having at least one upright leg disposed adjacent a side wall of the casing and being open at the upper end to enable lumpy material to flow from the inlet into the casing to within the flights, said casing at the inlet being provided with cover members disposed immediately above the upper end of said upright legs to prevent lumps becoming jammed between the same and the edge of the inlet.

2. In a conveyer for conveying lumpy material, in combination, a casing having an inlet opening in the top wall thereof, a conveyer element adapted to be drawn through the casing provided with a plurality of spaced flights, said flights being of a skeleton structure adapted to convey the material in a continuous stream through the casing and having at least one upright leg disposed adjacent a side wall of the casing and being open at the upper end to enable lumpy material to flow from the inlet into the casing to within the flights, said inlet in said casing being of a width less than the width of the casing to form cover members disposed immediately above the upper end of said upright legs to prevent lumps becoming jammed between the same and the edge of the inlet.

3. In a conveyer for conveying lumpy material, in combination, a casing having an inlet opening in the top wall thereof, a conveyer element adapted to be drawn through the casing provided with a plurality of spaced flights, said flights being of a U-shaped skeleton structure adapted to convey the material through the casing in a continuous stream and having two upright legs disposed adjacent the side walls of the casing, and providing an opening between the legs to enable lumpy material to flow from the inlet into the casing to within the flight, said casing at the inlet being provided with cover members disposed immediately above the upper end of said upright legs to prevent lumps becoming jammed between the same and the edge of the inlet.

ALFRED DE LOS SINDEN.